(12) United States Patent
Kim

(10) Patent No.: US 12,503,124 B2
(45) Date of Patent: Dec. 23, 2025

(54) DEVICE FOR PROCESSING WHEEL SPEED SENSOR SIGNAL ACCORDING TO ECU SWITCHING

(71) Applicant: HL MANDO CORPORATION, Gyeonggi-do (KR)

(72) Inventor: JoonHyeok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 187 days.

(21) Appl. No.: 18/120,337

(22) Filed: Mar. 10, 2023

(65) Prior Publication Data

US 2023/0286518 A1    Sep. 14, 2023

(30) Foreign Application Priority Data

Mar. 11, 2022  (KR) ................. 10-2022-0030623

(51) Int. Cl.
*B60W 50/00* (2006.01)

(52) U.S. Cl.
CPC ..... *B60W 50/00* (2013.01); *B60W 2050/0082* (2013.01); *B60W 2520/28* (2013.01)

(58) Field of Classification Search
CPC ......... B60W 50/00; B60W 2050/0082; B60W 2520/28
USPC ....................................................... 701/29.2
See application file for complete search history.

(56) References Cited

U.S. PATENT DOCUMENTS

| | | | | |
|---|---|---|---|---|
| 10,550,905 | B2 * | 2/2020 | Koh | ...... F16D 66/026 |
| 2017/0183008 | A1 * | 6/2017 | Isono | ...... B60W 30/18172 |
| 2018/0037201 | A1 * | 2/2018 | Yamazaki | ...... B60T 8/1755 |
| 2019/0100237 | A1 * | 4/2019 | Klesing | ............ B62D 5/0484 |
| 2020/0189395 | A1 * | 6/2020 | Takahashi | ........... B60L 3/04 |

(Continued)

FOREIGN PATENT DOCUMENTS

| | | | | |
|---|---|---|---|---|
| DE | 102018218837 B4 * | 6/2020 | ....... B60W 50/023 |
| EP | 3578428 B1 * | 8/2022 | ................ G01P 3/44 |

(Continued)

OTHER PUBLICATIONS

Sinha, Soham, and Richard West. "Towards an Integrated Vehicle Management System in DriveOS." ACM transactions on embedded computing systems 20.5s (2021): 1-24. Web. (Year: 2021).*

(Continued)

*Primary Examiner* — Russell Frejd
*Assistant Examiner* — Keith A von Volkenburg
(74) *Attorney, Agent, or Firm* — WOMBLE BOND DICKINSON (US) LLP

(57) ABSTRACT

According to an embodiment of the present invention, there is provided a wheel speed sensor (WSS) signal-processing device according to ECU switching, the device comprising an ECU including a first ECU and a second ECU performing a control operation based on a detection signal received from the WSS, wherein the first ECU identifies control information based on the detection signal and transmits the control information to the second ECU, and wherein the second ECU identifies an event in which an operating state of the first ECU is switched from an active state to an inactive state, and performs the control operation according to the control information in a section in which an operating state of the second ECU is switched from the inactive state to the active state according to the event.

11 Claims, 6 Drawing Sheets

(56) References Cited

U.S. PATENT DOCUMENTS

| | | | |
|---|---|---|---|
| 2020/0189538 A1* | 6/2020 | Ota | F16H 48/36 |
| 2020/0189599 A1* | 6/2020 | Ota | B60W 30/18172 |
| 2020/0307534 A1* | 10/2020 | Kurbasa | B60T 8/34 |
| 2021/0224169 A1* | 7/2021 | Kang | G06F 11/3006 |
| 2022/0194344 A1* | 6/2022 | Tarandek | B60T 8/17 |
| 2023/0184805 A1* | 6/2023 | Farres | B60T 17/18 |
| | | | 324/167 |
| 2024/0427345 A1* | 12/2024 | Bergquist | G05D 1/0214 |

FOREIGN PATENT DOCUMENTS

| | | | | |
|---|---|---|---|---|
| JP | 7535004 B2 * | 8/2024 | | B60R 25/32 |
| KR | 20080072985 A * | 8/2008 | | B62K 11/14 |

OTHER PUBLICATIONS

Hernandez, W. "Improving the Response of Wheel Speed Sensors by Using Robust and Optimal Signal Processing Techniques." Proceedings of the IEEE International Symposium on Industrial Electronics, 2005. ISIE 2005. vol. 3. IEEE, 2005. 1049-1053 vol. 3. Web (Year: 2005).*

Soham Sinha and Richard West. "Towards an Integrated Vehicle Management System in DriveOS." ACM transactions on embedded computing systems 20.5s (2021): 1-24. Web. (Year: 2021).*

* cited by examiner

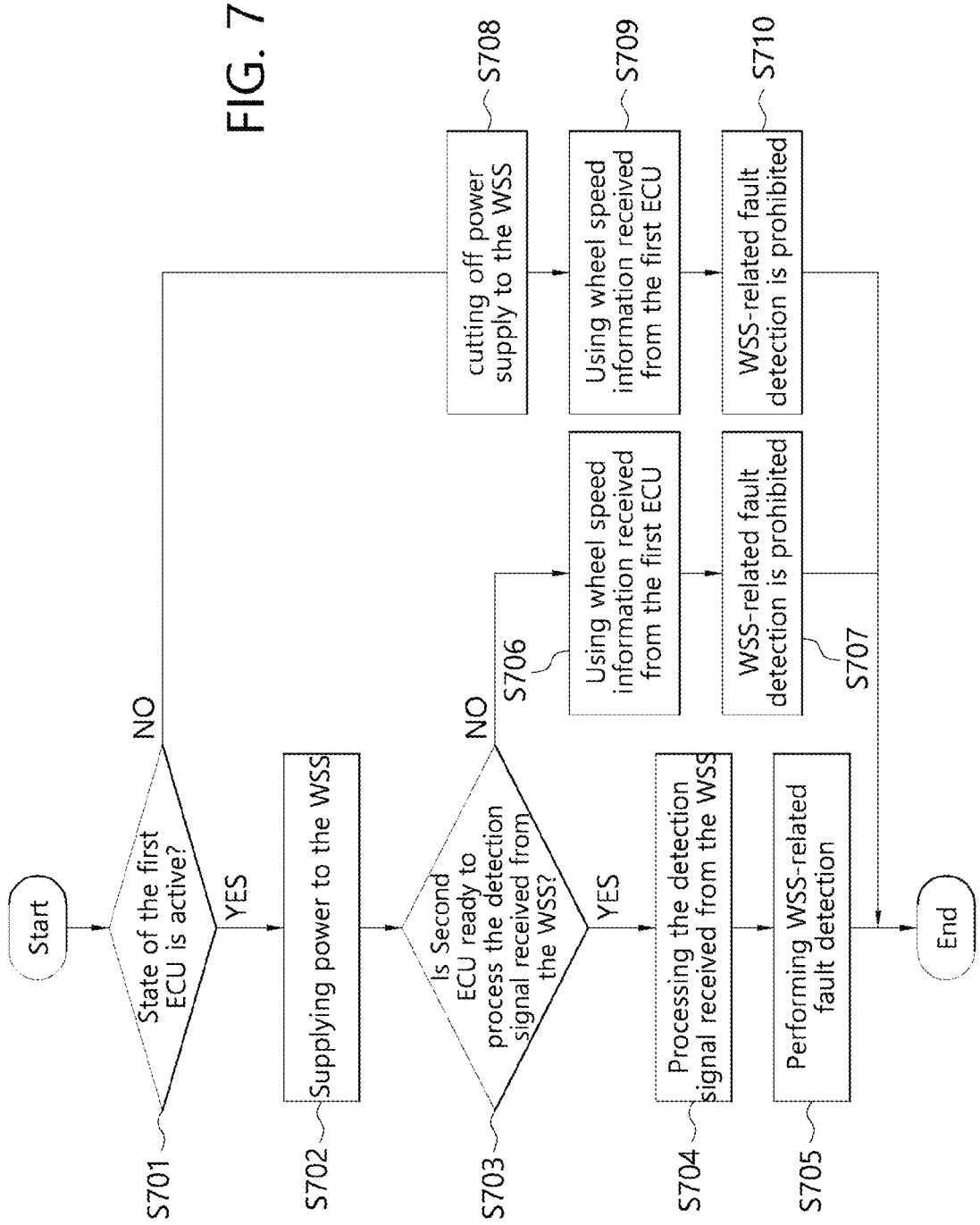

DEVICE FOR PROCESSING WHEEL SPEED SENSOR SIGNAL ACCORDING TO ECU SWITCHING

TECHNICAL FIELD

The present invention relates to a device for processing a wheel speed sensor signal according to ECU switching.

BACKGROUND ART

In general, in order to improve driving and braking stability of a vehicle, the vehicle is provided with an electronic stability control (ESC) system for preventing wheel slip, an anti-lock brake system (ABS), a traction control system (TCS), etc.

Information related to a wheel speed of the vehicle is required as one input for controlling such vehicle systems. To this end, a wheel of the vehicle is equipped with a wheel speed sensor (WSS) for detecting the wheel speed. The WSS is an equipment introduced to replace a mechanical connection between the wheel and a speedometer, and the electronic control unit (ECU) includes a detection circuit that receives a detection signal including sensing information detected by the WSS and processes and analyzes the received detection signal to detect the wheel speed of the vehicle.

Recently, as the spread of self-driving cars or electric vehicles has expanded and research has continued to reduce the weight and size of vehicles, which is one of the important tasks in the automobile industry, an integrated dynamic brake (IDB) system built by integrating ABS and ESC has been developed. Since this IDB system can control a parking brake as well as a service brake operated during normal driving, the brake system can be miniaturized and lightweight, and stability has been greatly improved while providing various functions.

Since many parts of the IDB system are composed of electronic equipment, a redundancy system including multiple ECUs is being built to increase reliability in the operation of the electronic parking brake system.

When connected to a system including two ECUs, the WSS may include a single type WSS having one IC chip and transmitting signals to and from any one of the two ECUs, and a dual type WSS having two IC chips wherein each IC chip is connected to each ECU to send and receive signals.

In the case of the dual type WSS connected to both ECUs, it is not required to switch the ECU performing a control operation even if only one of the ECUs operates. However, in the case of the single type WSS connected to one ECU, there may be a case in which the ECU performing a control operation needs to be switched. In this case, a gap occurs in the signal received from the WSS in the process of switching the connected ECU to another ECU.

Wheel speed, one of the information that can be obtained from detection signals received from the WSS, is an important reference condition for all equipment providing power to wheels through an engine (power train), and advanced driver assistance system (ADAS) in addition to vehicle braking control, so it is necessary to ensure continuity of WSS signal processing according to ECU switching.

DISCLOSURE

Technical Problem

An object of the present invention is to provide a more efficient WSS signal-processing device.

Technical Solution

According to an embodiment of the present invention, there is provided a wheel speed sensor (WSS) signal-processing device according to ECU switching, the device comprising an ECU including a first ECU and a second ECU performing a control operation based on a detection signal received from the WSS, wherein the first ECU is configured to: identify control information based on the detection signal and transmit the control information to the second ECU, and wherein the second ECU is configured to: identify an event in which an operating state of the first ECU is switched from an active state to an inactive state, and perform the control operation according to the control information in a section in which an operating state of the second ECU is switched from the inactive state to the active state according to the event.

The second ECU may perform the control operation according to the most recently received control information among the control information received before the event occurs.

The control information may include wheel speed.

The second ECU may switch the operating state from the inactive state to the active state according to the event.

The second ECU may receive a detection signal from the WSS based on completion of the switching of the operating state of the second ECU from the inactive state to the active state, identify the control information based on the detection signal, and perform the control operation according to the control information.

Any one of the first ECU and the second ECU operating in the active state may supply power to the WSS.

According to an embodiment of the present invention, the WSS signal-processing device may include the WSS connected to the ECU through a power line receiving power from the ECU and a transmission line transmitting the detection signal to the ECU.

The power line may include a switch to be connected to any one of the first ECU and the second ECU.

The section in which the operating state of the second ECU is switched from the inactive state to the active state includes: a first section in which the operating state of the second ECU is switched to the active state; and a second section in which the second ECU is ready to identify the control information based on the detection signal received from the WSS.

The second section may include a margin.

The second ECU may communicate with the first ECU through a data bus, and may identify the event based on a CAN signal received through the data bus.

According to an embodiment of the present invention, there is provided a method for controlling a wheel speed sensor (WSS) signal-processing device according to ECU switching, the method comprising the steps of: identifying control information based on a detection signal received from the WSS by a first ECU; transmitting the control information to the second ECU; identifying an event in which an operating state of the first ECU is switched from an active state to an inactive state; and performing a control operation according to the control information by the second ECU in a section in which an operating state of the second ECU is switched from the inactive state to the active state according to the event.

The performing may include performing the control operation according to the most recently received control information among the control information received before the event occurs.

Advantageous Effects

According to an embodiment of the present invention, a control error can be prevented by preventing discontinuity of control information which may occur in a system including a plurality of ECUs.

According to an embodiment of the present invention, even if the WSS is not connected to any of the plurality of ECUs, it is possible to prevent a gap in control information, thereby increasing the utilization of a single type WSS and resulting in cost reduction.

DESCRIPTION OF DRAWINGS

FIG. 7 is a flowchart illustrating an operation of a second ECU of a WSS signal-processing device according to an embodiment of the present invention.

BEST MODES OF THE INVENTION

Figure 1:
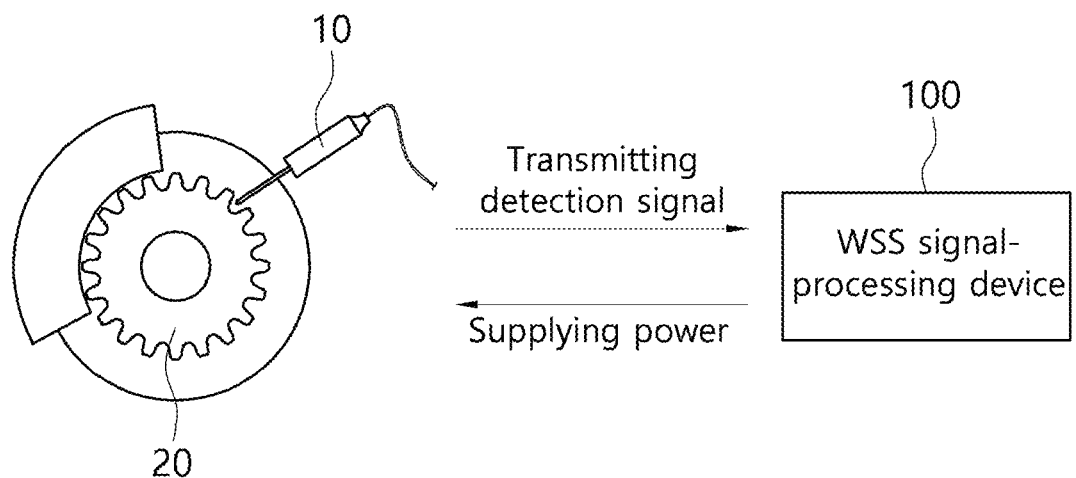
FIG. 1 is a diagram illustrating a relationship between a WSS and a WSS signal-processing device according to an embodiment of the present invention.

Hereinafter, with reference to the accompanying drawings, embodiments of the present invention will be described in detail so as to be easily implemented by one of ordinary skill in the art to which the present invention pertains. The present invention may be embodied in a variety of forms and is not be limited to the embodiments described herein. In order to clearly describe the present invention, parts irrelevant to the description are omitted from the drawings; and throughout the specification, same or similar components are referred to as like reference numerals.

In the specification, terms such as "comprise" or "have" are intended to designate that a feature, number, step, operation, component, part or combination thereof described in the specification is present, but should not be construed to preclude the possibility of the presence or addition of one or more other features, numbers, steps, operations, components, parts or combinations thereof.

FIG. 1 is a diagram illustrating a relationship between a WSS and a WSS signal-processing device according to an embodiment of the present invention.

In FIG. 1, a WSS 10, a tone wheel 20, and a WSS signal-processing device 100 are shown. The WSS 10 is a device mounted on an axle to output an electrical signal capable of detecting a rotational speed of a wheel. The tone wheel 20 is mounted on an axle and rotates in the same way as the rotation of the wheel, and may be composed of a concave-convex structure or a magnet having different electrodes. The tone wheel 20 may be coupled to the wheel of a vehicle and rotate together when the wheel rotates, and the WSS 10 may be installed at a predetermined distance apart from the outside of the tone wheel 20 in a radial direction.

The WSS 10 detects an AC signal generated by the tone wheel 20 rotating according to the movement of the wheel, and transmits the detected signal to the WSS signal-processing device 100. In this case, the AC signal may be recognized as a high-low signal having a cycle according to the rotational speed of the wheel. Meanwhile, in the present invention, the N/S pole may be recognized as a high-low signal by using a magnetic encoder instead of the tone wheel 20, but is not limited thereto.

In this case, the signal transmitted by the WSS 10 to the WSS signal-processing device 100 may be of a PWM type in addition to the high-low signal type having a cycle, but is not limited to the type and information included in the signal. For example, in the case of the PWM type, it may include additional information such as the direction of wheel rotation, the validity of the waveform received from the WSS, etc. in addition to the waveform about wheel speed, and the additional information may be used to allow other controls besides wheel speed control.

The WSS signal-processing device 100 supplies power to the WSS 10, and the WSS 10 transmits a signal detected from the tone wheel 20 to the WSS signal-processing device 100. The WSS signal-processing device 100 may appropriately process and treat the signals received from the WSS 10 and utilize them for various vehicle control.

Figure 2:
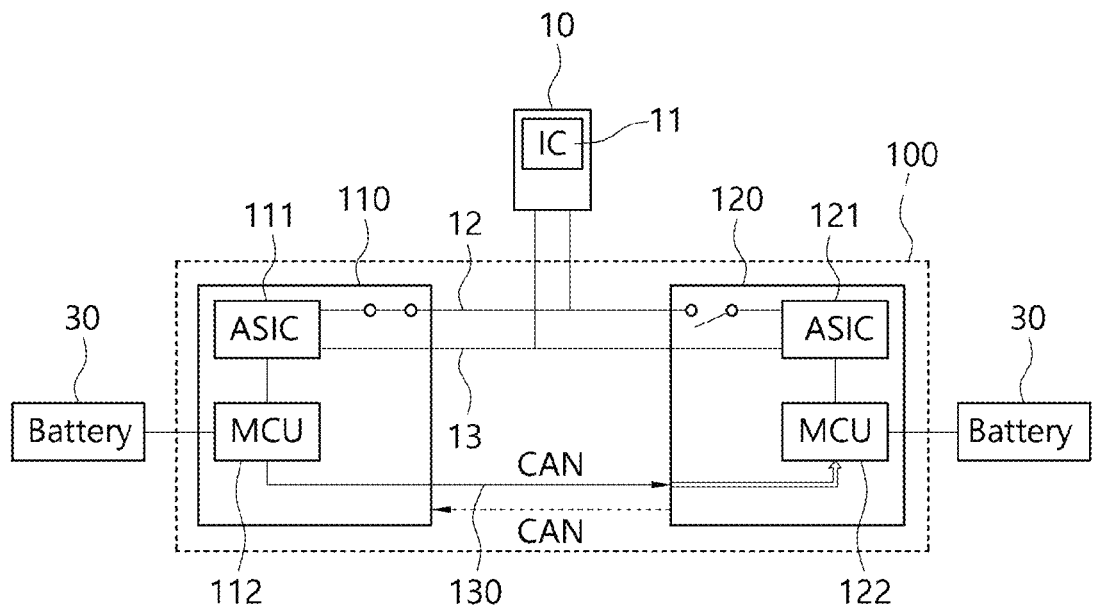
FIG. 2 is a diagram showing a connection structure between a WSS and a WSS signal-processing device according to an embodiment of the present invention.

FIG. 2 is a diagram showing a connection structure between the WSS and the WSS signal-processing device according to an embodiment of the present invention.

The WSS 10 according to an embodiment of the present invention is a single type WSS including one IC chip 11 that performs overall control such as signal detection and information transmission.

The WSS signal-processing device 100 according to an embodiment of the present invention includes two ECUs, a first ECU 110 and a second ECU 120. According to an embodiment of the present invention, the first ECU 110 is a master ECU, which is responsible for most of the main braking functions during the vehicle life cycle, and is always activated and operated unless an event affecting whether the first ECU 110 operates or not occurs. On the other hand, the second ECU 120 is a slave ECU, which performs the same performance as the first ECU 110 which is a master ECU, or minimum braking performance. The second ECU 120 is deactivated when the first ECU 110 normally operates, and is activated and operated only in an emergency, such as when the first ECU 110 does not operate.

Each of the first ECU 110 and the second ECU 120 includes an application-specific integrated circuit (ASIC) 111, an MCU 112, an ASIC 121, and an MCU 122.

The MCUs 112 and 122 receive power from a battery 30 and output control signals for operating the ASICs 111 and 121. Meanwhile, the battery 30 supplying power to the first ECU 110 and the second ECU 120 may be the same or different from each other, and the voltage of the power output from each battery 30 may be the same or different.

The ASICs 111 and 121 supply power to the WSS 10, and receive a detection signal received from the WSS 10 and perform processing such as wheel speed calculation. More specifically, the WSS 10 is connected to the ASICs 111 and 121 by a power line 12 and a ground line 13. The ASICs 111 and 121 may supply power to the WSS 10 through the power line 12, and the WSS 10 may transmit the detection signal to the ASICs 111 and 121 through the power line 12.

In this case, when the WSS 10 is connected to both the ASIC 111 of the first ECU 110 and the ASIC 121 of the second ECU 120 to receive power, the WSS 10 must transmit the detection signal to the first ECU 110 and the second ECU 120, whereby the detection signal in the form of a current is distributed to both sides along the circuit, making it impossible to transmit the current in a normal range.

When the WSS 10 cannot deliver the current in a normal range to the first ECU 110 that performs overall control of the vehicle, speed recognition cannot be performed normally using the current value distributed to the first ECU 110, which may lead to an error in vehicle control.

Accordingly, the WSS 10 may be designed so that any one of the first ECU 110 and the second ECU 120 operating in an active state supplies power to the WSS 10. According to one embodiment of the present invention, the power line 12 may include a switch to be connected to either the first ECU 110 or the second ECU 120.

Instead, since the second ECU 120 does not obtain any information from the WSS 10 when it is in an inactive state, the second ECU 120 may receive related information from the first ECU 110 through a data bus 130 so as to smoothly perform a role of assisting the first ECU 110.

As shown in FIG. 2, the WSS 10 is connected to one ECU, that is, the first ECU 110. However, when an ECU performing a control operation needs to be switched to the second ECU 120 due to a situation occurring in the first ECU 110, a gap is generated in the signal received from the WSS 10 in the process of activating the second ECU 120. That is, there may be a state in which the WSS 10 is not connected to either of the first ECU 110 and the second ECU 120. Since the ECU identifies the wheel speed through the detection signal received from the WSS, it is necessary to promote continuity of WSS signal processing for the smooth operation of the ECU even in situations such as ECU switching.

Hereinafter, referring to FIGS. 3 to 7, the WSS signal-processing device 100, which can increase reliability and efficiency of operations between the WSS 10 and the WSS signal-processing device 100 by performing continuity of WSS signal processing, will be described in detail.

Figure 3:
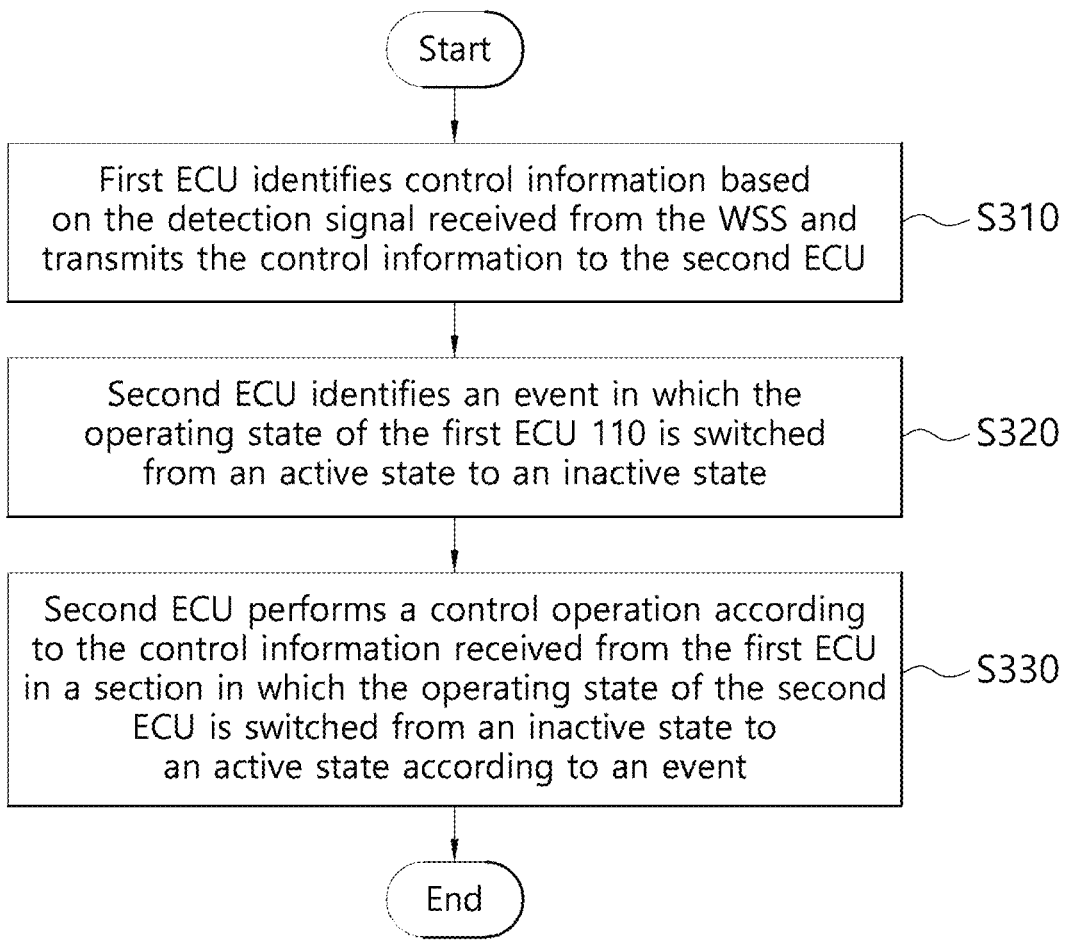
FIG. 3 is a flowchart illustrating an operation of a WSS signal-processing device according to an embodiment of the present invention.

FIG. 3 is a flowchart illustrating an operation of the WSS signal-processing device according to an embodiment of the present invention.

According to an embodiment of the present invention, the first ECU 110 can identify control information based on the detection signal received from the WSS 10 and transmit the control information to the second ECU 120 (S310).

Basically, the WSS 10 is connected to the first ECU 110 which is a master ECU, and in this case, the second ECU 120 is in an inactive state. Therefore, as described in FIG. 2, the first ECU 110 supplies power to the WSS 10 through the power line 12, and the power line 12 for supplying power from the second ECU 120 to the WSS 10 is blocked.

According to an embodiment of the present invention, the first ECU 110 can identify control information based on the detection signal. The control information may include additional information that can be used for vehicle control, such as wheel rotation direction, and validity of the waveform received from the WSS 10, in addition to wheel speed and waveforms related to wheel speed. The process of identifying the control information includes a process of processing, such as decoding, additional information that may be used for vehicle control.

Since the dynamic radius of the wheel is determined, the first ECU 110 can calculate the wheel speed based on how much a high-low signal enters the detection signal received from the WSS 10 within a predefined time.

As described with reference to FIG. 2, the first ECU 110 and the second ECU 120 can perform periodic or real-time communication through the data bus 130. The second ECU 120 may receive the control information identified by the first ECU 110 as a CAN signal through the data bus 130.

According to an embodiment of the present invention, the second ECU 120 can identify an event in which the operating state of the first ECU 110 is switched from an active state to an inactive state (S320).

The event in which the operating state of the first ECU 110 is switched from an active state to an inactive state may be, for example, a case where a defect occurs, such as a case where a component constituting the first ECU 110 fails, or a case where a control signal for operating the first ECU 110 has an error.

The second ECU 120 receives the CAN signal received from the first ECU 110 through the data bus as described in S310, but the CAN signal may not be transmitted when the above event occurs in the first ECU 110. Based on this, the second ECU 120 can identify that the first ECU 110 is switched to an inactive state. However, the identification method is not limited, and alternatively, whether the first ECU 110 operates normally may be identified through a pin for checking the operating state of the first ECU 110.

According to an embodiment of the present invention, the second ECU 120 can perform a control operation according to the control information received from the first ECU 110 in a section in which the operating state of the second ECU 120 is switched from an inactive state to an active state according to an event (S330).

The second ECU 120 is in an inactive state while the first ECU 110 is operating. However, as an event occurs in which the operating state of the first ECU 110 is switched from the active state to the inactive state, the operating state of the second ECU 120 should be switched to the active state. It takes some time until the operating state of the second ECU 120 is completely switched from the inactive state to the active state, and the second ECU 120 receives the detection signal from the WSS 10 to identify the control information like the first ECU 110. The section in which the operating state of the second ECU 120 is switched from the inactive state to the active state means this time. Details of the section in which the inactive state is switched to the active state will be described with reference to FIG. 5.

As described above, the second ECU 120 performs a control operation according to the control information received from the first ECU 110 in order to perform the control operation even in a state in which the WSS 10 is not connected to either of the first ECU 110 and the second ECU 120. According to an embodiment of the present invention, the control information received from the first ECU 110 may refer to control information received before the event in which an operating state of the first ECU 110 is switched from an active state to an inactive state occurs. According to an embodiment of the present invention, in order to further increase the reliability of the control, it may be the most recently received control information among the control information received before the event occurs.

The control operation according to an embodiment of the present invention includes braking control, and may also include operations controlled by various systems of the vehicle, but is not limited thereto. Hereinafter, wheel speed among the control information will be described in detail, but the description may also be applied to identified control information other than the wheel speed, except that it is specifically applied only to the wheel speed.

According to an embodiment of the present invention, a control error can be prevented by preventing discontinuity of control information which may occur in a system including a plurality of ECUs. In addition, the utilization of single type WSS increases, and the cost reduction effect occurs accordingly.

Figure 4:
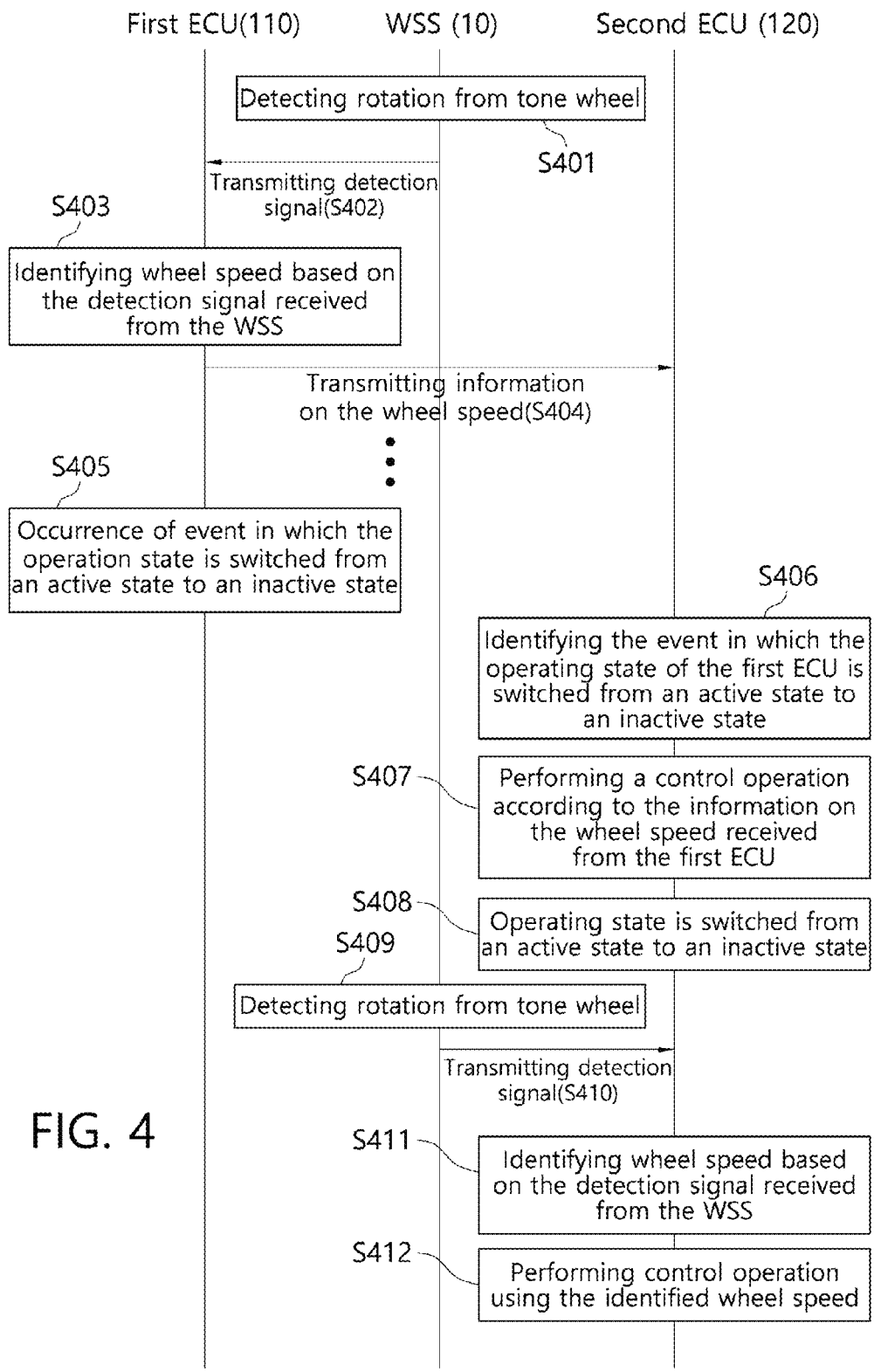
FIG. 4 is a flowchart illustrating operations of a WSS and a WSS signal-processing device according to an embodiment of the present invention.

FIG. 4 is a flowchart illustrating the operations of the WSS and the WSS signal-processing device according to an embodiment of the present invention.

FIG. 4 shows the flowchart described above in FIG. 3 according to the interaction between the WSS 10 and the first ECU 110 and the second ECU 120 of the WSS signal-processing device 100.

The WSS 10 detects rotation of the tone wheel 20 (S401), and transmits the detection signal to the first ECU 110 in an active state (S402). The first ECU 110 identifies the wheel speed based on the detection signal received from the WSS 10 (S403). The first ECU 110 transmits information on the wheel speed to the second ECU 120 (S404). While the WSS 10 and the first ECU 110 continuously repeat operations of S401 to S404, the first ECU 110 performs a control operation based on the identified wheel speed.

In an embodiment of the present invention, it is assumed that an event in which the operation state of the first ECU 110 is switched from an active state to an inactive state occurs (S405).

The second ECU 120 identifies the event in which the operating state of the first ECU 110 is switched from an active state to an inactive state (S406). The second ECU 120 performs a control operation according to the information on the wheel speed received from the first ECU 110 (S407). The information on the wheel speed received from the first ECU 110 in S407 refer to the information on the wheel speed received before the event in which an operating state of the first ECU 110 is switched from an active state to an inactive state occurs, as described above in S330 of FIG. 3. The second ECU 120 performs a control operation using the information received from the first ECU 110 because the switching to the active state has not yet been completed.

The second ECU 120 completes the switching of the operating state from the inactive state to the active state (S408).

The WSS 10 detects rotation from the tone wheel 20 (S409), and transmits the detection signal to the second ECU 120 in an active state (S410). The second ECU 120 identifies the wheel speed based on the detection signal received from the WSS 10 (S411). The second ECU 120 performs a control operation using the identified wheel speed (S412).

According to an embodiment of the present invention, a control error can be prevented by preventing discontinuity of the information on the wheel speed which may occur in a system including a plurality of ECUs. Therefore, even if the WSS 10 is not connected to either of the two ECUs, it is possible to prevent a gap in a signal related to the wheel speed, thereby increasing the utilization of the single type WSS.

Figure 5:
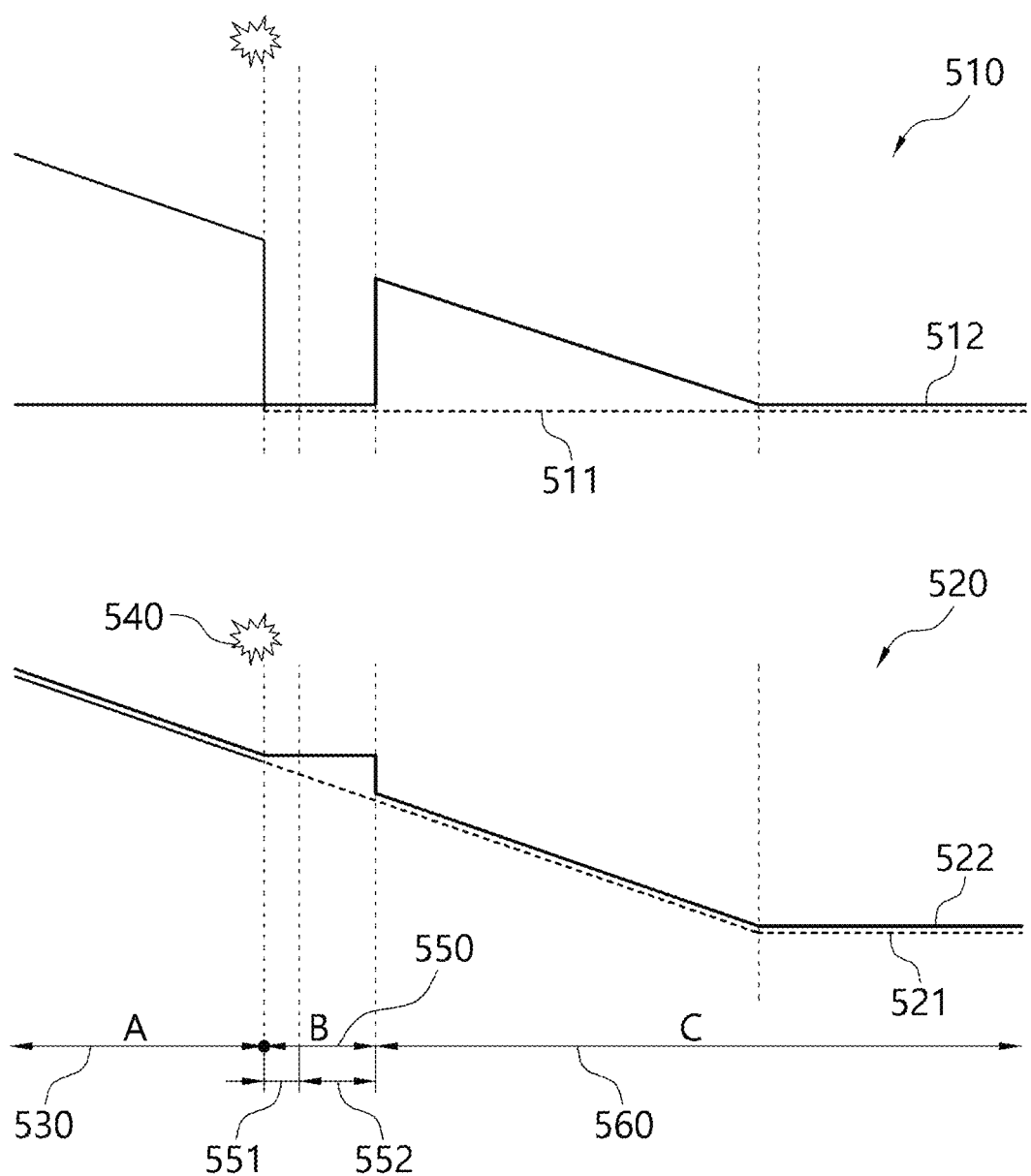
FIG. 5 is a graph showing a wheel speed according to an embodiment of the present invention.

FIG. 5 is a graph showing a wheel speed according to an embodiment of the present invention.

FIG. 5 illustrates a first graph 510 showing the wheel speed calculated based on a detection signal received from the WSS in each ECU, and a second graph 520 showing the wheel speed according to CAN signals generated or received in each ECU in the same situation and section as in the first graph 510. In this case, FIG. 5 assumes a situation in which braking control is performed.

More specifically, the first graph 510 is composed of a first speed graph 511 calculated by the first ECU 110 and a second speed graph 512 calculated by the second ECU 120. The second graph 520 is composed of a third speed graph 521 according to the CAN signal generated in the first ECU 110, and a fourth speed graph 522 according to the CAN signal received from the first ECU 110 by the second ECU 120 and the CAN signal generated in the second ECU 120. The speed values may be the same in a section in which the waveforms of the speed graphs are similar, but are shown to be misaligned for distinction between the graphs.

Hereinafter, the first graph 510 and the second graph 520 will be described separately for each section.

In section A 530, the first ECU 110 performs an operation in an active state. Accordingly, the first ECU 110 calculates the wheel speed based on the detection signal received from the WSS 10, and performs a vehicle control operation including braking control by referring to the calculated wheel speed. In addition, information on the calculated wheel speed is transmitted to the second ECU 120 through the CAN signal.

In section A 530, since the second ECU 120 is in an inactive state and in a state in which connection with the WSS 10 is blocked, it does not have a wheel speed value calculated as in the second speed graph 512, and recognizes a speed value according to the CAN signal received from the first ECU 110 as in the fourth speed graph 522.

When an event 540 occurs in which the first ECU 110 is switched from an active state to an inactive state, the second ECU 120 may identify the occurrence of the event 540 through various paths, as described in S320 of FIG. 3. In this case, the event 540 may occur at a specific time point or may occur in a specific section, but is not limited thereto.

When the event 540 occurs, the first ECU 110 is switched to an inactive state, and therefore, cannot receive a detection signal from the WSS 10 and thus cannot calculate the wheel speed as in section B 550. Therefore, in section B 550, there is no calculated wheel speed value as in the first speed graph 511, and there is no output of a CAN signal transmitted to the second ECU 120 as in the third speed graph 521.

In this case, section B 550 includes a first section 551 in which the second ECU 120 identifies the event 540 and switches the operating state of the second ECU 120 from an inactive state to an active state, and a second section 552 in which the activated second ECU 120 supplies power to the WSS 10 again and is ready to identify the wheel speed based on the detection signal received from the WSS 10.

More specifically, the first section 551 includes a section identifying that the operating state of the second ECU 120 needs to be switched to the active state. The second section 552 may be a section in which the ECU to which the WSS 10 is connected is switched from the first ECU 110 to the second ECU 120, and it can be switched through a switch operation of the power line 12 connected to the WSS 10. The second section 552 may further include a margin for a time when the actual second ECU 120 can calculate the wheel speed based on the detection signal received from the WSS 10 to prevent erroneous control.

Since the gap of the WSS detection signal occurs as the first ECU 110 is switched to the inactive state, the second ECU 120 performs braking control based on the wheel speed according to the CAN signal received from the first ECU 110 before the event 540 occurs in the B section 550. In this case, the CAN signal received from the first ECU 110 may be the last CAN signal received from the first ECU 110 by the second ECU 120. This is because the most recently received CAN signal may well reflect the vehicle control status.

Therefore, looking at the fourth speed graph 522, during the section B 550, the second ECU 120 performs braking control based on the wheel speed according to the CAN signal received from the first ECU 110 before the event 540 occurs.

The second ECU 120 has complete control in section C 560 in which the ECU to which the WSS 10 is connected is completely switched from the first ECU 110 to the second ECU 120. Therefore, after section C 560, there are only CAN signals generated in the second ECU 120 and having the wheel speed values calculated by the second ECU 120 as shown in the second speed graph 512 and the fourth speed graph 522.

Figure 6:
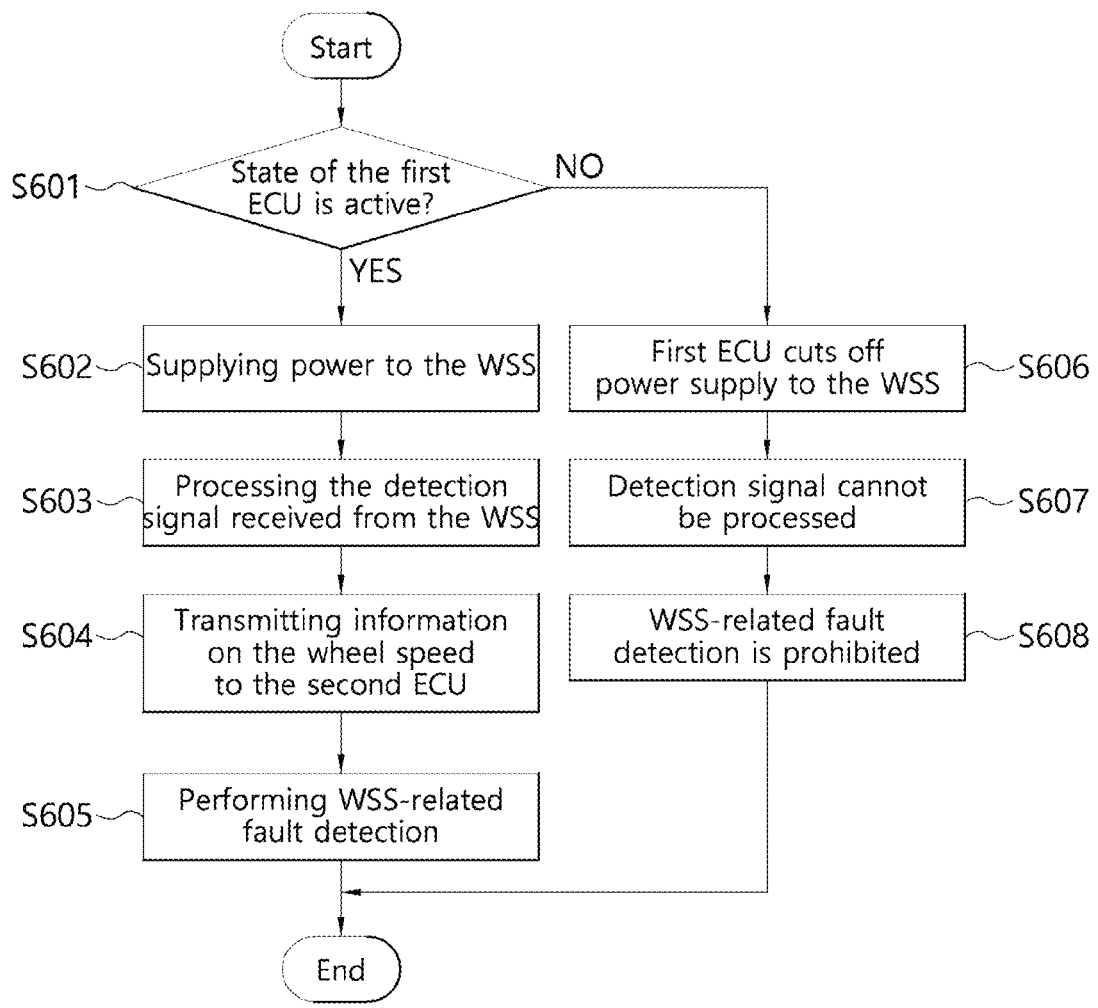
FIG. 6 is a flowchart illustrating an operation of a first ECU of a WSS signal-processing device according to an embodiment of the present invention.

FIG. 6 is a flowchart illustrating an operation of the first ECU of the WSS signal-processing device according to an embodiment of the present invention.

As a result of determining whether the state of the first ECU 110 is active or not (S601), if the operating state of the first ECU 110 is active (Yes in S601), the first ECU 110 supplies power to the WSS 10 (S602). The first ECU 110 processes the detection signal received from the WSS 10 (S603). The detection signal is processed as described in S310 of FIG. 3 above.

The first ECU 110 processes the received detection signal and transmits information on the acquired wheel speed to the second ECU 120 (S604).

The first ECU 110 performs fault detection related to the WSS 10 (S605). The WSS 10-related fault detection means overall fault detection, such as whether the current of the detection signal received from the WSS 10 is within a normal range, and whether the connection with the WSS 10 is working smoothly.

If the operating state of the first ECU 110 is in an inactive state (No in S601), the first ECU 110 cuts off power supply to the WSS 10 (S606).

The operation is blocked so that the first ECU 110 cannot process the detection signal received from the WSS 10 (S607) and cannot detect the WSS 10-related fault (S608). In the case of a fault of a short circuit such as an open short of the WSS 10, if power is not properly supplied to the WSS 10, reliability of the signal transmitted by the WSS 10 may be lowered. In addition, even if an error occurs in the first ECU 110, internal components for operating the ECU may appear to operate normally. In this case, if the received detection signal is processed or the WSS 10-related fault detection operation is performed, reliability of the entire ECU system may not be guaranteed. Therefore, in order to prevent false detection, signal processing and fault detection are prohibited when the operating state of the first ECU 110 is in an inactive state.

FIG. 7 is a flowchart illustrating an operation of the second ECU of the WSS signal-processing device according to an embodiment of the present invention.

This figure describes the operation after the state of the first ECU 110 is switched from the active state to the inactive state.

As a result of determining whether the state of the second ECU 120 is active or not (S701), if the operating state of the second ECU 120 is active (Yes in S701), the second ECU 120 supplies power to the WSS 10 (S702).

It is identified whether the second ECU 120 is ready to process the detection signal received from the WSS 10 (S703). This may occur in section B 550 described in FIG. 5.

If the second ECU 120 is ready to process the detection signal received from the WSS 10 (Yes in S703), the second ECU 120 processes the detection signal received from the WSS 10 (S704), and performs the WSS 10-related fault detection (S705). The detection signal is processed as described in S310 of FIG. 3 above, and the WSS 10-related fault detection is the same as described in step S605 of FIG. 6 above.

If the second ECU 120 is not ready to process the detection signal received from the WSS 10 (No in S703), the second ECU 120 performs a control operation using the wheel speed information received from the first ECU 110 (S706). Since the second ECU 120 is not yet ready to receive the detection signal from the WSS, the WSS 10-related fault detection is prohibited (S707).

Returning to S701, when the operating state of the second ECU 120 is inactive (No in S701), the second ECU 120 cuts off power supply to the WSS 10 (S708). The second ECU 120 performs a control operation using the wheel speed information received from the first ECU 110 (S709). Since the second ECU 120 is not yet ready to receive the detection signal from the WSS, the WSS 10-related fault detection is prohibited (S710).

DESCRIPTION OF REFERENCE NUMERALS

20: WSS
100: WSS signal-processing device
110: first ECU
120: second ECU

The invention claimed is:

1. A wheel speed sensor (WSS) signal-processing device according to an electronic control unit (ECU) switching, the device comprising:
  a first ECU configured to:
    identify first information on wheel speed based on a detection signal received from the WSS,
    transmit the first information to a second ECU, and
    perform a control operation based on the first information while in section A,
  the second ECU configured to:
    perform a control operation based on the first information while in section B, and
    perform a control operation based on second information while in section C, the second information being on wheel speed which is identified based on a detection signal directly received from the WSS,
  wherein section A is a state in which the first ECU is active and the second ECU is inactive,
  wherein the transition from section A to section B occurs when the first ECU is switched from an active state to an inactive state,
  wherein section B includes a first section and a second section:
    the first section corresponds to the time required to switch the operating state of the second ECU from the inactive state to the active state, and
    the second section corresponds to the time required for the second ECU to be ready to identify the control information based on the detection signal received directly from the WSS,
  wherein section C is a state in which the second ECU is ready to identify the control information based on the detection signal received directly from the WSS.

2. The WSS signal-processing device according to claim 1, wherein the first information is most recently received information on the wheel speed among the information on the wheel speed received before the first ECU switch from an active state to an inactive state.

3. The WSS signal-processing device according to claim 1, wherein the second ECU is configured to switch the operating state from the inactive state to the active state in case identifying the first ECU switch from an active state to an inactive state.

4. The WSS signal-processing device according to claim 3, wherein the second ECU is configured to:
receive a detection signal from the WSS based on completion of the switching of the operating state of the second ECU from the inactive state to the active state,
identify the control information based on the detection signal, and
perform the control operation according to the control information.

5. The WSS signal-processing device according to claim 1, wherein any one of the first ECU and the second ECU operating in the active state is configured to supply power to the WSS.

6. The WSS signal-processing device according to claim 1, wherein the WSS signal-processing device includes the WSS connected to the ECU through a power line receiving power from the ECU and a transmission line transmitting the detection signal to the ECU.

7. The WSS signal-processing device according to claim 6, wherein the power line includes a switch to be connected to any one of the first ECU and the second ECU.

8. The WSS signal-processing device according to claim 1, wherein the second section includes a margin.

9. The WSS signal-processing device according to claim 3, wherein the second ECU is configured to communicate with the first ECU through a data bus, and
identify the event based on a CAN signal received through the data bus.

10. A method for controlling a wheel speed sensor (WSS) signal-processing device according to an electronic control unit (ECU) switching, the method comprising the steps of:
identifying, by a first ECU, first information on wheel speed based on a detection signal received from the WSS;
transmitting the first information to a second ECU;
performing, by the first ECU, a control operation based on the first information while in section A;
identifying an event in which an operating state of the first ECU is switched from an active state to an inactive state;
performing, by the second ECU, a control operation based on the first information while in section B; and
performing, by the second ECU, a control operation based on second information while in section C, the second information being on wheel speed which is identified based on a detection signal directly received from the WSS;
wherein section A is a state in which the first ECU is active and the second ECU is inactive,
wherein the transition from section A to section B occurs when the first ECU is switched from an active state to an inactive state,
wherein section B includes a first section and a second section:
the first section corresponds to the time required to switch the operating state of the second ECU from the inactive state to the active state, and
the second section corresponds to the time required for the second ECU to be ready to identify the control information based on the detection signal received directly from the WSS,
wherein section C is a state in which the second ECU is ready to identify the control information based on the detection signal received directly from the WSS.

11. The method for controlling a WSS signal-processing device according to claim 10, wherein the first information is most recently received information on the wheel speed among the information on the wheel speed received before the first ECU switch from an active state to an inactive state.

* * * * *